United States Patent
Lee et al.

(10) Patent No.: US 10,153,465 B2
(45) Date of Patent: Dec. 11, 2018

(54) TOP CAP ASSEMBLY FOR SECONDARY BATTERY

(71) Applicant: LG CHEM, LTD., Seoul (KR)

(72) Inventors: Je Jun Lee, Daejeon (KR); Sang Sok Jung, Daejeon (KR); Hang Soo Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 345 days.

(21) Appl. No.: 14/705,410

(22) Filed: May 6, 2015

(65) Prior Publication Data

US 2016/0099443 A1   Apr. 7, 2016

(30) Foreign Application Priority Data

Oct. 2, 2014 (KR) .................. 10-2014-0132949

(51) Int. Cl.
*H01M 2/00* (2006.01)
*H01M 2/04* (2006.01)
*H01M 2/34* (2006.01)
*H01M 2/12* (2006.01)
*H01M 10/654* (2014.01)
*H01M 2/08* (2006.01)

(52) U.S. Cl.
CPC ......... *H01M 2/046* (2013.01); *H01M 2/1241* (2013.01); *H01M 2/34* (2013.01); *H01M 10/654* (2015.04); *H01M 2/08* (2013.01); *H01M 2200/00* (2013.01)

(58) Field of Classification Search
CPC .. H01M 2/0482; H01M 2/046; H01M 2/1241; H01M 2/34; H01M 10/654; H01M 2200/00; H01M 2/08
See application file for complete search history.

(56) References Cited

U.S. PATENT DOCUMENTS

| | | | |
|---|---|---|---|
| 9,748,529 B2 * | 8/2017 | Jung | ............ H01M 2/0413 |
| 2011/0104549 A1 | 5/2011 | Kim | |
| 2013/0273401 A1 | 10/2013 | Lee et al. | |

FOREIGN PATENT DOCUMENTS

| | | | | |
|---|---|---|---|---|
| JP | 2009-245650 A | 10/2009 | | |
| KR | 10-2011-0035625 A | 4/2011 | | |
| KR | 10-2011-0046803 A | 5/2011 | | |
| KR | 10-2013-0009691 A | 1/2013 | | |
| WO | WO 2013009148 A2 * | 1/2013 | ........ | H01M 2/08 |

* cited by examiner

*Primary Examiner* — Nicholas P D'Aniello
(74) *Attorney, Agent, or Firm* — Birch, Stewart, Kolasch & Birch, LLP

(57) ABSTRACT

Provided is a top cap assembly for a cylindrical type secondary battery, including a CID short-circuiting member, which interrupts an electric current when a high voltage is generated in the cylindrical type secondary battery, a safety vent connected to an upper part of the CID short-circuiting member and including a plurality of notches, which are broken when a voltage equal to or greater than an allowable voltage of the CID short-circuiting member is generated, to discharge gas from the cylindrical type secondary battery, a top cap connected to the safety vent and disposed on the uppermost end of an upper opening part of the cylindrical type secondary battery, a gasket surrounding and sealing an outer circumferential surface of the CID short-circuiting member, and a heat resistant member preventing heat transfer between the gasket and the safety vent.

7 Claims, 2 Drawing Sheets

PRIOR ART

TOP CAP ASSEMBLY FOR SECONDARY BATTERY

CROSS-REFERENCE TO RELATED APPLICATIONS

This application claims the priority of Korean Patent Application No. 10-2014-0132949 filed on Oct. 2, 2014, in the Korean Intellectual Property Office, the disclosure of which is incorporated herein by reference.

BACKGROUND OF THE INVENTION

Field of the Invention

The present invention relates to a top cap assembly for a secondary battery, and more particularly, to a top cap assembly for a secondary battery which provides improved safety.

Description of the Related Art

Since secondary batteries, which are rechargeable, can be miniaturized and be manufactured to have high capacity, the development and use of secondary batteries are growing. Secondary batteries include: an electrode assembly, which includes an anode, a cathode, and a separator; and an exterior part accommodating and sealing the electrode assembly and electrolyte. Secondary batteries may be classified into cylindrical type secondary batteries, prismatic type secondary batteries, and pouch type secondary batteries according to structural features thereof.

Cylindrical type secondary batteries include a cylindrical can, an electrode assembly accommodated in the cylindrical can, and a top cap assembly coupled to an upper part of the cylindrical can. The top cap assembly finishes the upper end of an opening part of the cylindrical can.

FIG. 1 is a view illustrating a top cap assembly in the related art. Referring to FIG. 1, the top cap assembly includes: a current interrupt device (CID) short-circuiting member 40, which interrupts an electric current when a high voltage is generated in a battery; a safety vent 30 connected to an upper part of the CID short-circuiting member 40 and including a plurality of notches, which are broken when a voltage equal to or greater than an allowable voltage of the CID short-circuiting member 40 is generated, to discharge gas from the battery; a top cap 20 disposed on the uppermost end of an upper opening part of a can 10 of the battery that is a cylindrical type secondary battery; and a gasket 50 surrounding and sealing an outer circumferential surface of the CID short-circuiting member 40.

When the cylindrical type secondary battery undergoes external short-circuiting, the gasket 50 surrounding the CID short-circuiting member 40 may be easily molten and deformed at a high temperature. Accordingly, the possibility that the CID short-circuiting member 40 and the safety vent 30 are brought into contact with and stuck to each other increases. In addition, when the CID short-circuiting member 40 and the safety vent 30 are brought into contact with each other, the CID short-circuiting member 40 and the safety vent 30 fail to interrupt an electric current, and thus, the battery may explode.

SUMMARY OF THE INVENTION

Accordingly, the present invention aims at providing a top cap assembly for a secondary battery, which prevents contact between a CID short-circuiting member and a safety vent when external short-circuiting occurs.

An aspect of the present invention provides a top cap assembly for a cylindrical type secondary battery, which finishes an upper end of an opening part of the cylindrical type secondary battery, the top cap assembly including: a CID (current interrupt device) short-circuiting member, which interrupts an electric current when a high voltage is generated in the cylindrical type secondary battery; a safety vent connected to an upper part of the CID short-circuiting member and including a plurality of notches, which are broken when a voltage equal to or greater than an allowable voltage of the CID short-circuiting member is generated, to discharge gas from the cylindrical type secondary battery; a top cap connected to the safety vent and disposed on the uppermost end of an upper opening part of the cylindrical type secondary battery; a gasket surrounding and sealing an outer circumferential surface of the CID short-circuiting member; and a heat resistant member preventing heat transfer between the gasket and the safety vent.

Thus, even when the gasket is broken, the heat resistant member prevents direct contact between the CID short-circuiting member and the safety vent.

The heat resistant member may be formed of one of a poly tetra fluoro ethylene-based material and a polyamide-based material.

The heat resistant member may be provided as a film or a tape.

The heat resistant member may be disposed between the gasket and an edge of a lower surface of the safety vent.

The heat resistant member may be disposed on the entire lower surface of the safety vent.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
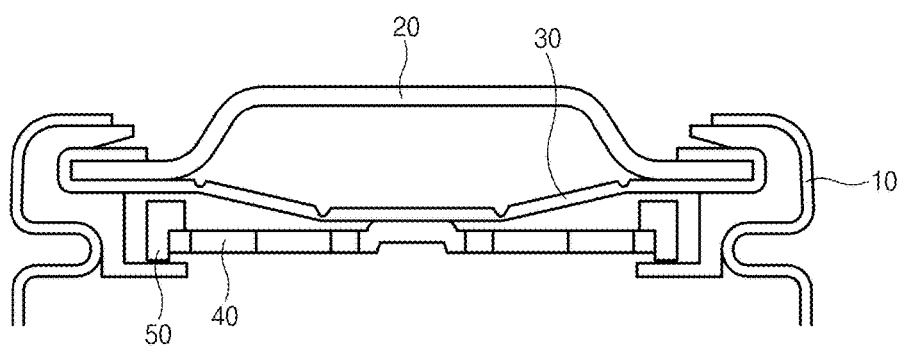
FIG. 1 is a view illustrating a top cap assembly for a secondary battery in the related art.
Figure 2:
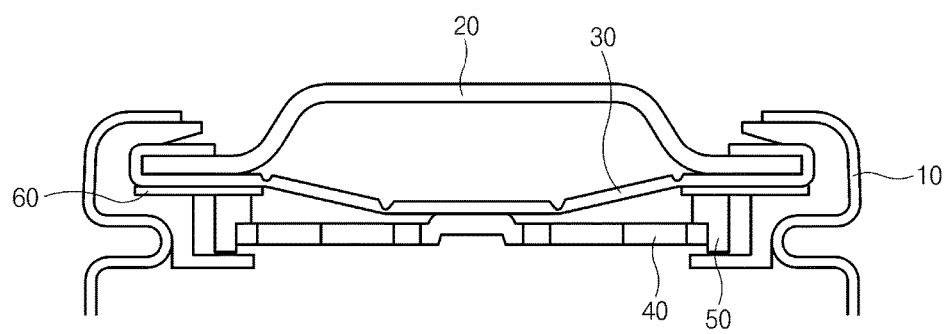
FIG. 2 is a view illustrating a top cap assembly for a secondary battery according to the present invention.

FIG. 2 is a view illustrating a top cap assembly including a top cap 20 for a secondary battery according to the present invention. Referring to FIG. 2, a top cap assembly for a secondary battery according to the present invention includes: a current interrupt device (CID) short-circuiting member 40, which interrupts an electric current when a high voltage is generated in the secondary battery; a safety vent 30 connected to an upper part of the CID short-circuiting member 40; the top cap 20 connected to the safety vent 30 and disposed on the uppermost end of an upper opening part of a can 10 of the secondary battery that is a cylindrical type secondary battery; a gasket 50 surrounding and sealing an outer circumferential surface of the CID short-circuiting member 40; and a heat resistant member 60 preventing heat transfer between the gasket 50 and the safety vent 30.

The top cap 20 is disposed on the uppermost end of an opening part of the cylindrical type secondary battery and has a central part protruding upward into a convex shape to electrically connect the cylindrical type secondary battery to a part out of the cylindrical type secondary battery.

When a voltage equal to or greater than an allowable voltage of the CID short-circuiting member 40 is generated, a plurality of notches of the safety vent 30 are broken to discharge high pressure gas generated in the secondary battery, thereby reducing the possibility of explosion of the secondary battery. The safety vent 30 has a shape, the edge of which is bent to surround the top cap 20 disposed over the safety vent 30, and the central part of which protrudes downward to contact a side of the CID short-circuiting member 40 disposed under the safety vent 30. The notches of the safety vent 30 are spaced a predetermined distance from one another. Thus, when inner pressure of the cylindrical type secondary battery increases, the notches are broken to thereby discharge gas from the cylindrical type secondary battery to the outside thereof.

When a high voltage is generated in the cylindrical type secondary battery, the CID short-circuiting member 40 short-circuits to interrupt an electric current. The CID short-circuiting member 40 is connected to a lower end of the safety vent 30 through welding. The gasket 50 surrounds the outer circumferential surface of the CID short-circuiting member 40 as described above.

The heat resistant member 60 is disposed between the safety vent 30 and the gasket 50 surrounding the CID short-circuiting member 40. The heat resistant member 60 is disposed on a lower surface of the safety vent 30, that is, on a surface facing the CID short-circuiting member 40 disposed on the lower end of the top cap 20. The heat resistant member 60 prevents heat transfer between the gasket 50 and the safety vent 30 as described above. Thus, the heat resistant member 60 is formed of a heat resistant material such as a poly tetra fluoro ethylene or polyamide based material. In this case, the heat resistant member 60 is provided in the form of a film or a tape to be attached to the lower surface of the safety vent 30, so that the heat resistant member 60 can be provided using a simple method. However, the present invention is not limited thereto, and thus, a heat resistant liquid may be applied to the lower surface of the safety vent 30 or be formed thereon through a coating process.

When the gasket 50 surrounding the CID short-circuiting member 40 is molten and broken by external short-circuiting, the heat resistant member 60 prevents contact between the safety vent 30 and the CID short-circuiting member 40. For the heat resistant member 60 to effectively prevent the contact between the safety vent 30 and the CID short-circuiting member 40, a location in which the heat resistant member 60 is disposed on the lower surface of the safety vent 30 may be delimited. The heat resistant member 60 extends from an edge portion of the safety vent 30, which easily contacts the CID short-circuiting member 40 when the gasket 50 is molten and broken, that is, from a portion of the safety vent 30 bent toward the top cap 20. The heat resistant member 60 may extend from the bent portion of the safety vent 30 to the notches of the safety vent 30. Alternatively, the heat resistant member 60 may extend from a side of the portion of the safety vent 30 bent toward the top cap 20 to another side thereof and be thus disposed on the entire lower surface of the safety vent 30. The case that the heat resistant member 60 extends from the bent portion of the safety vent 30, that is, from the edge portion thereof to the notches of the safety vent 30 may reduce manufacturing costs, compared with the case that the heat resistant member 60 is disposed on the entire lower surface of the safety vent 30, and prevent the heat resistant member 60 from protecting the notches of the safety vent 30 when the safety vent 30 is broken. In the case that the heat resistant member 60 is disposed on the entire lower surface of the safety vent 30, even when external short-circuiting occurs more clearly to melt and break the gasket 50 and displace the safety vent 30 and the CID short-circuiting member 40, the heat resistant member 60 prevents contact between the safety vent 30 and the CID short-circuiting member 40.

As described above, since the heat resistant member 60 is disposed between the safety vent 30 and the gasket 50, even when the cylindrical type secondary battery undergoes external short-circuiting to melt and deform the gasket 50, the heat resistant member 60 prevents contact between the safety vent 30 and the CID short-circuiting member 40 surrounded by the gasket 50. Accordingly, safety of the cylindrical type secondary battery can be further improved, compared with the safety of the cylindrical type secondary batteries in the related art.

As described above, a heat resistant member of a top cap assembly for a secondary battery according to the present invention prevents contact between a CID short-circuiting member and a safety vent even when a gasket surrounding the CID short-circuiting member is molten and deformed by external short-circuiting of the secondary battery, thereby improving safety of the second battery.

While the present invention has been shown and described in connection with the exemplary embodiments, it will be apparent to those skilled in the art that modifications and variations can be made without departing from the spirit and scope of the invention as defined by the appended claims.

What is claimed is:

1. A top cap assembly for a cylindrical type secondary battery, which finishes an upper end of an opening part of the cylindrical type secondary battery, the top cap assembly comprising:
   a CID (current interrupt device) short-circuiting member, which interrupts an electric current when a high voltage is generated in the cylindrical type secondary battery;
   a safety vent connected to an upper part of the CID short-circuiting member and comprising a plurality of notches, which are broken when a voltage equal to or greater than an allowable voltage of the CID short-circuiting member is generated, to discharge gas from the cylindrical type secondary battery;
   a top cap connected to the safety vent and disposed on the uppermost end of an upper opening part of the cylindrical type secondary battery;
   a single body gasket surrounding and sealing an outer circumferential surface of the CID short-circuiting member, the gasket directly contacting the outer circumferential surface of the CID short-circuiting member; and
   a heat resistant member preventing heat transfer between the gasket and the safety vent, wherein the heat resistant member is disposed between the gasket and an edge of a lower surface of the safety vent.

2. The top cap assembly of claim 1, wherein the heat resistant member is formed of one of a poly tetra fluoro ethylene-based material and a polyamide-based material.

3. The top cap assembly of claim 1, wherein the heat resistant member is provided as a film or a tape.

4. The top cap assembly of claim 1, wherein the heat resistant member is disposed on the entire lower surface of the safety vent extending from one side of the safety vent located at one side of the top cap to an opposite side of the safety vent located at an opposite side of the top cap.

5. A top cap assembly for a cylindrical type secondary battery, which finishes an upper end of an opening part of the cylindrical type secondary battery, the top cap assembly comprising:
- a CID (current interrupt device) short-circuiting member, which interrupts an electric current when a high voltage is generated in the cylindrical type secondary battery;
- a safety vent connected to an upper part of the CID short-circuiting member and comprising a plurality of notches, which are broken when a voltage equal to or greater than an allowable voltage of the CID short-circuiting member is generated, to discharge gas from the cylindrical type secondary battery;
- a top cap connected to the safety vent and disposed on the uppermost end of an upper opening part of the cylindrical type secondary battery;
- a gasket surrounding and sealing an outer circumferential surface of the CID short-circuiting member; and
- a heat resistant member preventing heat transfer between the gasket and the safety vent, the heat resistant member extending radially inward from the gasket such that a portion of the heat resistant member is not in contact with the gasket.

6. A top cap assembly for a cylindrical type secondary battery, which finishes an upper end of an opening part of the cylindrical type secondary battery, the top cap assembly comprising:
- a CID (current interrupt device) short-circuiting member, which interrupts an electric current when a high voltage is generated in the cylindrical type secondary battery;
- a safety vent connected to an upper part of the CID short-circuiting member and comprising a plurality of notches, which are broken when a voltage equal to or greater than an allowable voltage of the CID short-circuiting member is generated, to discharge gas from the cylindrical type secondary battery;
- a top cap connected to the safety vent and disposed on the uppermost end of an upper opening part of the cylindrical type secondary battery;
- a gasket surrounding and sealing an outer circumferential surface of the CID short-circuiting member; and
- a heat resistant member preventing heat transfer between the gasket and the safety vent, the heat resistant member being formed of one of a poly tetra fluoro ethylene-based material and a polyamide-based material, and the heat resistant member being provided as a film or a tape separate from the gasket.

7. A top cap assembly for a cylindrical type secondary battery, which finishes an upper end of an opening part of the cylindrical type secondary battery, the top cap assembly comprising:
- a CID (current interrupt device) short-circuiting member, which interrupts an electric current when a high voltage is generated in the cylindrical type secondary battery;
- a safety vent connected to an upper part of the CID short-circuiting member and comprising a plurality of notches, which are broken when a voltage equal to or greater than an allowable voltage of the CID short-circuiting member is generated, to discharge gas from the cylindrical type secondary battery;
- a top cap connected to the safety vent and disposed on the uppermost end of an upper opening part of the cylindrical type secondary battery;
- a gasket surrounding and sealing an outer circumferential surface of the CID short-circuiting member; and
- a heat resistant member preventing heat transfer between the gasket and the safety vent, the heat resistant member being disposed on the entire lower surface of the safety vent extending from one side of the safety vent located at one side of the top cap to an opposite side of the safety vent located at an opposite side of the top cap.

* * * * *